123,650

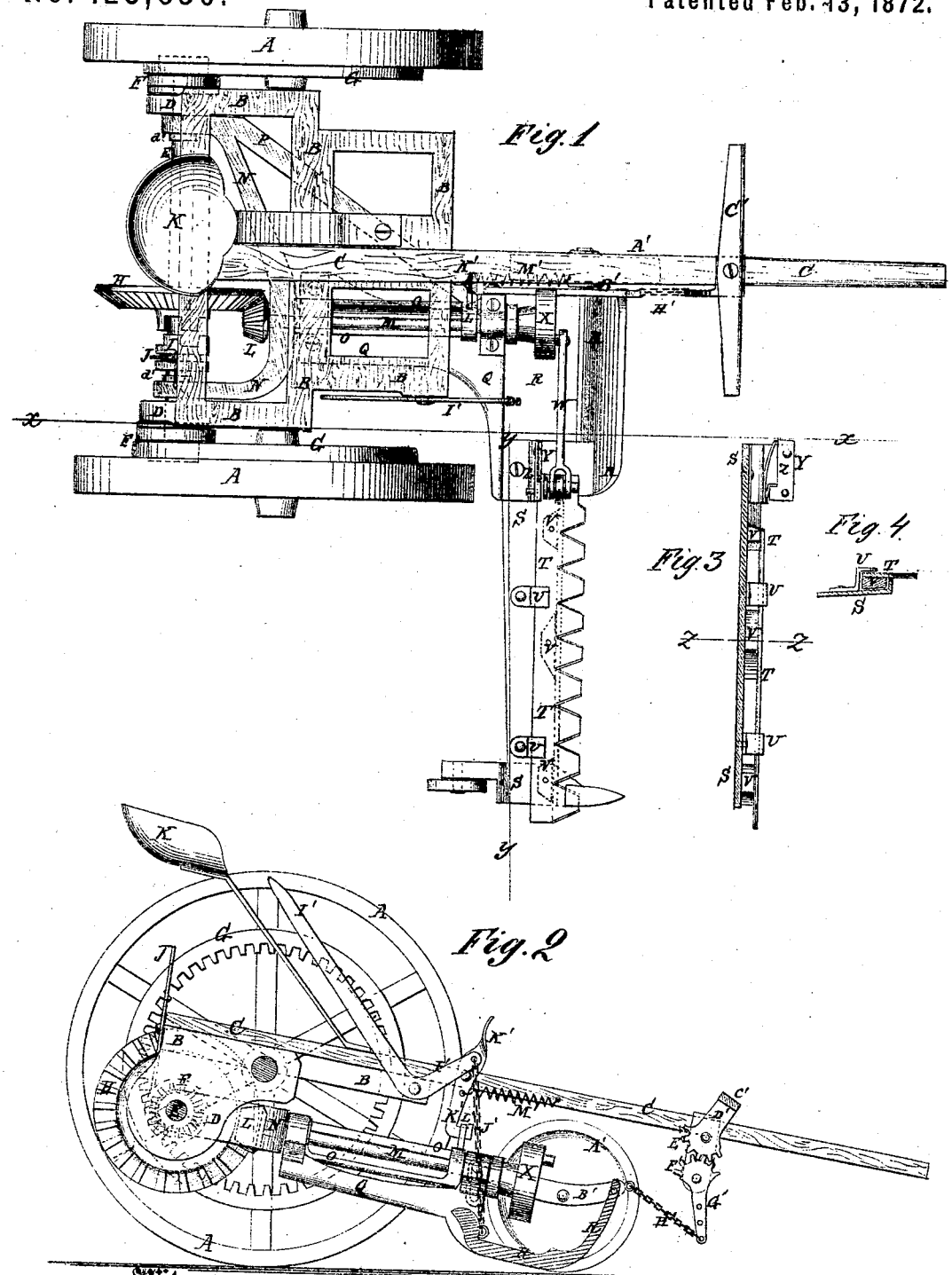

UNITED STATES PATENT OFFICE.

DANIEL H. THAYER, OF LUDLOWVILLE, NEW YORK.

IMPROVEMENT IN HARVESTERS.

Specification forming part of Letters Patent No. 123,650, dated February 13, 1872.

*To all whom it may concern:*

Be it known that I, DANIEL H. THAYER, of Ludlowville, in the county of Tompkins and State of New York, have invented a new and useful Improvement in Harvesters; and I do hereby declare that the following is a full, clear, and exact description thereof, which will enable others skilled in the art to make and use the same, reference being had to the accompanying drawing forming part of this specification, in which—

Figure 1 is a top view of my improved harvester. Fig. 2 is a vertical longitudinal section of the same taken through the line $x\ x$, Fig. 1. Fig. 3 is a longitudinal section of the cutter-bar taken through the line $y\ y$, Fig. 1. Fig. 4 is a cross-section of the cutter-bar taken through the line $z\ z$, Fig. 3.

Similar letters of reference indicate corresponding parts.

My invention will first be fully described and then clearly pointed out in claims.

A are the drive-wheels, which work upon journals formed upon or attached to the frame B of the harvester. C is the tongue, which is securely attached to the frame B. Upon the under side of the rear part of the ends of the frame B are formed, or to them are attached, arms or brackets D in bearings or boxes $d'$, in which revolve the journals of the shaft E. Upon the ends of the shaft E are placed small gear-wheels F, the teeth of which mesh into the teeth of the large gear-wheels G formed upon or attached to the drive-wheels A. The small gear-wheels F are connected with the shaft E by pawls and ratchet-wheels, so that the cutters may be operated by the advance of the machine, and not by its backward movement. H is a bevel-gear wheel revolving loosely upon the shaft E. The shaft E is made to carry the gear-wheel H with it in its revolution by the clutch I sliding upon the said shaft E, and which is moved forward and back to take hold of and release the gear-wheel H by the lever J, the forked end of which rides upon a groove in the said clutch I. The lever J is pivoted to the frame B, and its upper end projects into such a position that it may be conveniently reached and operated by the driver from his seat K. The teeth of the bevel-gear wheel H mesh into the teeth of the small bevel-gear wheel L attached to the rear end of the shaft M. The shaft M passes through a hole in the bar N along the grooved upper side of the arm or bar O, and through bearings in the front and rear ends of the said bar or arm O. The bar N is curved, as shown in Fig. 1, to pass around the gear-wheels H L, and its ends are perforated to receive and ride upon the projecting inner ends of the boxes $d'$, in which the shaft E revolves, and which are held stationary in the arms or brackets D by set-screws or other fastenings. The rear end of the arm O is formed solid with the bar N, and its forward end is strengthened by the brace P, also cast solid with the bar N and arm O. Q is an arm or plate, upon the forward end of which is formed or to it is attached the shoe R. The arm or plate Q is hung from the front and rear ends of the arm or bar O, through which ends the shaft M passes. S is the finger-bar, the inner end of which is attached to the shoe R, and the forward edge of which is turned up or flanged, as shown in Fig. 4, for the sickle-bar T to rest against. The sickle-bar T is kept in place and held forward against the flanged or turned-up edge of the cutter-bar S by stops U attached to the said finger-bar S, and which overlap the rear edge of the sickle-bar T, as shown in Figs. 1, 3, and 4. V are blocks attached to the under side of the sickle-bar T, and which rest and slide upon the upper side of the finger-bar S to support the said sickle-bar T in proper position. The blocks V are beveled off or inclined, as shown in Fig. 1, so that as the sickle-bar T vibrates the said blocks may push back any dirt or stalks that might otherwise work in beneath the sickle-bar T and clog it. The inclined blocks V make the sickle-bar self-clearing. To the inner end of the sickle-bar T is attached an eye, to which is pivoted the end of the connecting-rod W, the other end of which is pivoted to the small crank-wheel X attached to the end of the shaft M. The end of the rod W is pivoted to the eye of the sickle-bar T by a pin, which passes through the said rod and eye, and is kept in place without any nut or key by a stop-plate, Y, and pivoted plate Z. The stop-plate Y is attached to the finger-bar S in such a position that the head of the said pivoting-pin may move along the inner side of the said plate Y as the sickle-bar T is making its stroke. The outer end of the stop Y is cut off, as shown in Figs. 1 and 3, so that the head of the said pivoting-pin may be beyond the end of the said stop Y when the sickle-bar T is at the outer end of its stroke. The plate Z is pivoted to the inner end of the stop Y so as to shut down along the outer side of the said stop Y, and is made longer than the stop, and its projecting end is made thicker, so that the inner surface of the stop Y and plate Z may be flush with each other to keep the said pivoting-pin in place throughout its entire movement. The plate Z is held in place, both when down and when raised, by a small spring placed beneath the lower edge of its rear part, as shown in Fig. 3.

By this arrangement the sickle-bar can be easily and quickly attached and detached when required.

The shoe R is supported by the wheel A', which is arranged at the inner end of the said shoe R instead of being placed in front or beneath the shoe in the ordinary manner. The wheel A' revolves upon a journal attached to the bar B', the forward end of which is pivoted to the forward part of the inner end of the shoe R, and its rear end is adjustably secured to the rear part of the inner end of the said shoe by a bolt which passes through a slot in a cross-head formed upon the said rear end of the said bar B'.

By this construction the shoe R may be conveniently adjusted to run closer to or further from the ground, as may be desired. The wheel A' also serves as a guard to keep the inner end of the shoe R from being obstructed or clogged.

C' is the double-tree, which is pivoted to the upper end of an arm, D', which is pivoted near its lower end to a support attached to the tongue C. Upon the lower end of the arm D' is formed the segment of a gear-wheel, E', the teeth of which mesh into the teeth of the segment of a gear-wheel, F', formed upon the upper end of the arm G', which is pivoted near its upper end to the same support as the arm D'. The lower end of the arm G' is connected with the shoe R by a short chain or rod, H', the rear end of which is attached to the inner end of the shoe R or to the forward end of the bar B', and its forward end is attached to the lower end of the arm G', several holes being formed in the said arm for the attachment of the said chain, so that the point of draft attachment may be raised and lowered as desired.

By this arrangement the draft will be distributed, part being applied to the shoe R and part being applied through the tongue C to the main frame of the machine.

The object of combining the pinion-levers D' G', tongue C, and flexible connection with a double-tree above the tongue is not only to divide the draft strain between the main frame and cutting-mechanism, and thereby produce an easy draft, but also to raise the traces and prevent the horses from getting their legs over them.

I' is a bent lever, the end of the short arm of which is connected with the outer end of the shoe R by a short chain, J', so that by operating the said lever I' the driver can raise the cutters from the ground, when desired, for passing obstructions. K' is a catch-lever, which is pivoted to the tongue C or front of the frame B in such a position that its upper end may be conveniently reached and operated by the driver with his foot. The lower end of the lever K' has a shoulder or hook formed upon it to catch upon a hook, L', attached to the inner end of the shoe R or to the arm O to support the shoe and cutters when raised into an erect position for transportation. The lever K' is held forward by a spring, M', one end of which is attached to said lever, and its other end to the tongue C. The lever K' may also serve as a stop to prevent the shoe and cutters from jumping up when at work.

By this arrangement when it is desired to raise the cutters the driver operates the lever I', which raises the cutters and the outer end of the shoe R, and at the same time he operates the catch-lever K' with his foot to catch it upon the hook L'. The cutters can then be easily raised into an erect position upon the catch-lever K' as a pivot.

Having thus described my invention, I claim as new and desire to secure by Letters Patent—

1. The stop, consisting of stationary plate Y, pivoted plate Z, finger-bar S, pivoted cutter-bar T, and rod W, all arranged substantially as and for the purpose described.

2. The pinion-lever G' attached to shoe by flexible connection, the tongue C, and pinion-lever D', in combination with a double-tree pivoted to said lever D' and above said tongue, substantially as and for the purpose set forth.

3. The combination, with main and vibrating frames of lever K' and hook L', arranged to serve both as a stop and as a suspending hook, substantially as and for the purpose described.

DANIEL H. THAYER.

Witnesses:
A. M. LUCAS,
FRANK A. LUCAS.